US008547592B2

(12) United States Patent
Luellau et al.

(10) Patent No.: US 8,547,592 B2
(45) Date of Patent: Oct. 1, 2013

(54) DEVICE AND METHOD FOR DIGITAL EXPOSURE

(75) Inventors: Friedrich Luellau, Vögelsen (DE); Stefan Eggers, Wentdorf (DE)

(73) Assignee: Xeikon IP BV, GZ Eede (NL)

( * ) Notice: Subject to any disclaimer, the term of this patent is extended or adjusted under 35 U.S.C. 154(b) by 1224 days.

(21) Appl. No.: 10/577,930

(22) PCT Filed: Nov. 3, 2003

(86) PCT No.: PCT/EP03/12252
§ 371 (c)(1),
(2), (4) Date: Jun. 13, 2006

(87) PCT Pub. No.: WO2005/052853
PCT Pub. Date: Jun. 9, 2005

(65) Prior Publication Data
US 2007/0046771 A1   Mar. 1, 2007

(51) Int. Cl.
*H04N 1/00*   (2006.01)
*B41J 2/385*   (2006.01)

(52) U.S. Cl.
USPC .......................................... 358/1.6; 347/118

(58) Field of Classification Search
USPC .................................. 347/239, 248; 358/1.6
See application file for complete search history.

(56) References Cited

U.S. PATENT DOCUMENTS

| 5,049,901 | A * | 9/1991 | Gelbart ........................... 347/239 |
| 6,204,875 | B1 * | 3/2001 | De Loor et al. ................ 347/241 |
| 6,249,306 | B1 | 6/2001 | Isono et al. |
| 6,529,261 | B2 * | 3/2003 | Shinada .......................... 355/41 |
| 6,624,877 | B2 | 9/2003 | Uemura et al. |
| 6,859,223 | B2 * | 2/2005 | Shirota et al. ................ 347/239 |
| 2001/0048460 | A1 | 12/2001 | Uemura |
| 2003/0021493 | A1 | 1/2003 | Wada et al. |

FOREIGN PATENT DOCUMENTS

| DE | 199 44 760 A | 3/2001 |
| EP | 0 750 418 A | 12/1996 |
| JP | 2002-72494 | 3/2002 |
| WO | WO 01/21413 | 3/2001 |

* cited by examiner

*Primary Examiner* — Benny Q Tieu
*Assistant Examiner* — Sunil Chacko
(74) *Attorney, Agent, or Firm* — Collard & Roe, P.C.

(57) ABSTRACT

The invention relates to a device for exposing light-sensitive materials, with an electronic picture memory (2) for storing a master image, with an exposure unit which comprises a light source (22), an electronically activatable light modulator (21) for representing a part picture (24) of the master image (2), and imaging optics (23) for the projection of the part picture (24) onto the light sensitive material (10), with a drive device consisting of motors (9) and of a motor control (12), for moving the exposure unit (8) parallel to the surface of the light-sensitive material (10), with a scroll means (7) for scrolling a picture strip (25, 26) of the master image through the light modulator (21), and with a control device (1) for synchronizing the drive device (9, 12) with the scroll means (7). For reducing the processing time for the exposure of the complete printing plate (10), according to the invention, it is envisaged for a rapid intermediate memory (16) for storing a strip-like region to be provided, from which the picture data for the part picture (24) to be exposed, in each case, may be transmitted onto the light modulator (21) synchronously with the movement of the exposure unit (8).

18 Claims, 1 Drawing Sheet

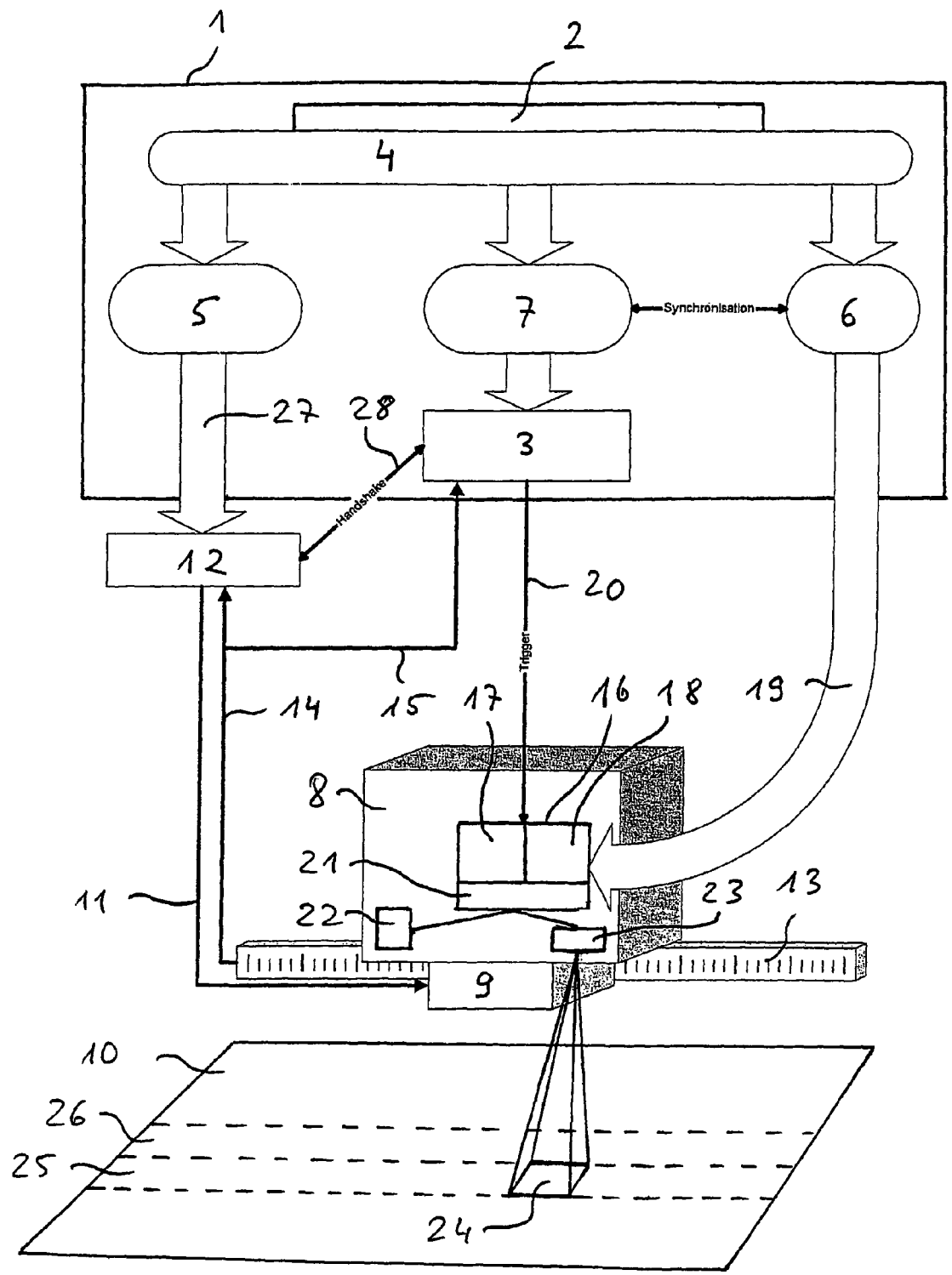

DEVICE AND METHOD FOR DIGITAL EXPOSURE

CROSS REFERENCE TO RELATED APPLICATIONS

Applicants claim priority under 35 U.S.C. §365 of PCT/EP2003/012252 filed Nov. 3, 2003. The international application under PCT article 21(2) was not published in English.

The invention relates to a device and to a method for the digital exposure of light-sensitive materials. The device has an electronic picture memory for storing a master image, an exposure unit which preferably comprises a light source, an electronically controllable light modulator for representing a part picture of the master image, and imaging optics for projection of the part picture onto the light-sensitive material, a drive device consisting e.g. of servo-motors and of a motor control, for the movement of the exposure unit parallel to the surface of the light-sensitive material, a scroll means for scrolling a picture strip of the master image through the light modulator, and a control device for synchronising the drive device with the scroll means.

Such an exposure device is known for example from WO 01/21413 A1. A through-irradiated LCD-screen or a reflecting micro-mirror arrangement, also known as a DMD or digital mirror device, are considered as a light modulator. In contrast to an exposure method with which part pictures roughly the size of a stamp are exposed with an exposure unit which is stationary at the point in time of exposure, and the exposure unit is displaced to the next exposure position between two exposures (step-and-repeat method), scrolling has the advantage that the exposure does not need to be interrupted for positioning procedures which must be effected in the meantime.

In practice, the ratio of the positioning time to the exposure time is roughly 1:1. If the scrolling method spares almost all positioning procedures, the processing time for the completion of the exposure procedure may be reduced by about 50 percent. If for example the material surface to be exposed is divided into 100×100=10'000 part pictures and these are exposed in the step and repeat method, one requires 10'000 positioning procedures. With the continuous, strip-wise exposure of light-sensitive material, one only requires 100 positioning procedures for the 100 strips, so that 9'900 positioning procedures and thus 99 percent of the positioning time are saved. These correspond to about 50 percent of the processing time, so that the throughput of an exposure apparatus may be doubled with the use of the scrolling method.

However, with the use of the scrolling method, the problem occurs that the light modulator, thus the LCD-screen or the DMD-chip itself provides no shift register functions. For this reason, the picture data for the entire part picture must always be transmitted to the light modulator in a complete manner, when the part picture only shifts by a single picture line on scrolling. The complete part picture however typically consists for example of 1'000 lines times 1'000 columns, so that as a whole at least 1'000'000 pixels or more result. With the shifting by one line, the complete picture information must be transmitted for all pixels. A quick scrolling requires the transmission of the total part picture information to be repeated several thousand times per second. Enormous data flows arise from this, which in the case of the DMD may technically amount to 7.6 Gbits/s. The usual control/activation of the light modulator by way of a computer is overwhelmed by these data flows. The processing of the exact position of the exposure unit and the synchronisation with the picture data demands a high-resolving, real-time access to the momentary position data, which may not be realised with a PC, even with a real-time operating system.

It is the object of the invention to specify an exposure device of the initially mentioned type, with which an exposure in the quick scrolling mode is possible.

This object is solved by the invention in that a rapid intermediate memory is provided for storing a strip-like region of the master image, from which the picture data for the respective part picture to be exposed, may be transmitted onto the light modulator synchronously with the movement of the exposure unit. The intermediate memory particularly with regard to hardware, is suitable for a particularly quick access. It does not need to record the complete master image, but only a strip-like region of the master image, from which in turn the picture data which just at that moment is needed by the light modulator for the exposure, may be called up. Thereby, the intermediate memory is synchronised with the movement of the exposure unit via a suitable synchronisation means This permits a rapid, synchronous picture data transmission to the light modulator without a direct participation of the computer, which may not ensure the accurate synchronisation in real-time.

Since the picture information of part pictures which differ by only one line is very redundant, the high data rate occurs only with the transmission between the intermediate memory and the light modulator, since the total information contained in a picture strip is for example transmitted to the light modulator a thousand times, when this comprises 1'000 lines. The refreshing of the picture information of a complete picture strip, which is stored in the intermediate memory, may therefore be effected by a computer without any problems, since the data flow required for this turns out to be lower by a factor of 1'000.

The intermediate memory is preferably arranged in the exposure unit. In this manner, the data leads between the intermediate memory and the light modulator may be kept short. This not only reduces the material costs, but also the susceptibility to malfunctioning.

The total picture processing time for the exposure of a complete printing plate may be reduced even further, if the transmission of the next picture strip may be effected simultaneously with the exposure of the actual picture strip. This may be preferably achieved in that the intermediate memory comprises two part memories for the storage of two strips of the master image, and during the transmission of the data from a first part memory to the light modulator for the exposure of a first strip, the data for the exposure of the next strip of the master image may be transmitted from the computer to the second part memory. The time for the transmission of the data from the picture memory of the computer to the intermediate memory of the exposure unit does not then contribute to the total exposure time.

In a preferred embodiment, the control device consists of a computer with a control program, wherein the picture memory is also accommodated in the computer. In this manner, the components of the exposure device which are not particularly critical with regard to time may be represented by a computer which may be obtained inexpensively.

In one embodiment of the invention, it is envisaged for the control program to comprise an exposure data manager, a picture data manager and a position data manager, wherein the picture data of the picture memory is divided up by the exposure data manager into data packages which are suitable for the stripwise exposure, and are transferred to the picture data manager, wherein the exposure data manager produces position data and speed data for the motor control which are transferred to the position data manager.

In one embodiment of the invention, the control program comprises the scroll means which cooperates with a trigger card which is designed with regard to hardware, wherein the trigger card is connected to position sensors which provide data on the actual position of the exposure unit and wherein the trigger card controls the data flow from the intermediate memory to the light modulator synchronously with the movement of the exposure unit and gives rise to a handshake between the trigger card and motor control, causes the motor control to call up the position- and speed data from the position data manager and to activate the servomotors accordingly. The representation of the trigger functions by way of a hardware trigger card ensures a rapid procedural control in real-time, which would not be possible with a direct software representation.

In a further development of the invention, it is envisaged for the scroll means to cooperate with the picture data manager in a manner such that the stepwise transmission of picture data from the picture data manager to the intermediate memory is always effected just when no data for the activation of the light modulator is taken from the respective part memory.

Exposers with a scrolling function with which the switch-on time of the light modulator pixel is very small compared to the time for travelling over a pixel at a given relative speed between the light modulator and the underlay to be exposed, are known from the field of photo-finishing apparatus for the exposure of photo paper. Due to the relatively short switch-on time, one reduces the blurring of the edges of the pixels and thus achieves a sharper/clearer representation. The short switch-on durations are only tolerated because the photo-paper is extremely light sensitive.

In contrast, one only has a very slight light sensitivity with the exposure of many other light-sensitive materials, such as printing plates for example or screen printing stencils. For this reason, a relatively short switch-on on time in relation to the travel time on travelling over a pixel leads as a whole to a very long processing time for the complete surface of the light-sensitive sensitive material. For shortening the processing duration therefore, with an exposure, the ratio of the switch-on time to the travel time must be selected as large as possible. One preferred embodiment of the exposure device according to the invention therefore envisages the exposure time for a pixel being equal to the travel time which the exposure unit requires for travelling over a pixel width. Thereby, a blurring of the pixel edges surprisingly does not occur, as trials have ascertained. One explanation for this may be the relatively steep gamma curve and the development method for such low light-sensitive materials.

For reducing visible transitions from one picture strip to the adjacent picture strip, it is suggested for the division of the master image into strips to be effected in a manner such that the strips partly overlap and for the light quantity per pixel serving for the exposure being arranged in a reducing manner towards the edges of the strips, so that a uniform exposure of the complete surface of the light-sensitive material results. Even without a partial overlapping, thus with a direct rowing-together of exposure strips, one should reckon with the necessity of matching the optical impression of the left and right picture strip edge. This too may be affected via a reduction of the light quantity for the individual columns of the picture strip. For the reduction of the light quantity in the edge regions of the strips, one may either apply a reduced light intensity with a constant exposure time or a reduced exposure time with a constant light intensity. Particularly with micromirror arrangements (DMD), the light intensity may only be switched digitally. This either means switched on 100 percent or completely switched off. For this reason, only the control of the light quantity by way of a shortened exposure time is considered. This in turn may be effected by reduced switch-on times of all pixels of the light modulator which are arranged consecutively in the movement direction of the exposure unit, or in the case of the DMD, only with constant switch-on times by a reduction of the pixels which participate as a whole in the exposure and which lie in the travel direction. The quantitative description of the display change is indicated as an overlay.

A method for the exposure of light-sensitive materials using the above described exposure device with which the picture data and position- and speed data is produced and further processed as described above, also belongs to the invention.

One embodiment of the invention is hereinafter described in more detail by way of the drawing. The single FIGURE shows: FIG. 1 a schematic representation of an exposure device according to the invention In FIG. 1, one recognises a control device 1 which is represented by a frame. The control device 1 consists of a computer with a picture memory 2, a control program and a trigger card 3. The control program consists of an exposure data manager 4, which represents the highest program level, of a position data manager 5, of a picture data manager 6 and of a scroll means 7. The data flows are indicated by way of arrows.

An exposure unit 8 is provided outside the control device 1 and by way of two servomotors of which only one servomotor 9 is represented in FIG. 1, is displaceably arranged in a two-dimensional manner over the surface of a printing plate 10 to be exposed. The servomotor 9 is designed as a linear motor and is connected to a motor control 12 via a control lead 11. The same applies to the other servomotor which is not represented. A position sensor 13 produces position data on the respective position of the exposure unit 8, and transmits this via a signal lead 14 to the motor control 12 and via a further signal lead 15 to the trigger card 3. The same applies to the position sensor for producing position data of the other position coordinates, which has not been shown.

The exposure unit 8 contains an intermediate memory 16 which consists of two part memories 17, 18. The intermediate memory 16 is supplied with picture data and overlay data from the control device 1 (computer) via a data lead 19. Furthermore, the intermediate memory 16 is connected to the trigger card 3 via a trigger lead 20. Finally, the intermediate memory 16 is also connected to a light modulator 21, in the present case a DMD. The light of a light source is incident onto the light modulator 21 which guides the light onto imaging optics 23. The imaging optics 23 project a part picture 24 onto the light-sensitive material 10. The exposure of the light-sensitive material 10 is effected in strips, wherein two strips 25, 26 are highlighted as an example.

Essentially three instances participate in the exposure process. On the one hand the exposure unit 8 must be positioned. The software instance for this is the position data manager 5, the associated hardware is represented by the motor control 12 in cooperation with the linear motors 9 and the position sensors 13.

Secondly, the picture data must be displayed. The software instance for this is the picture data manager 6. The associated hardware is the intermediate memory 16 in the exposure unit 8

Thirdly, the movement of the exposure unit 8 and the data flow of the picture data must be synchronized. The software instance for this is the scroll means 7, the associated hardware can be found in the trigger card 3 which is incorporated into the computer, which here serves as a control device 1.

The trigger card 3 has an input for the signal lead 15 for transmitting the position data of the position sensor 13 which provides the actual position of the exposure unit 8 with a resolution of 0.1 μm. Furthermore, the trigger card 3 has a memory which is not shown, in which instructions of at least one exposure of the complete strip 25, 26 with the dimensions "light modulator width times picture width on the light sensitive material 10", may be stored. The processing of these instructions is effected with real-time resolution of 33 MHz in a FPGA on the trigger card 3. Thereby, the outputs of the trigger card may be individually connected depending on the position of the exposure unit 8, the system time and the current condition of the input leads.

The picture information is redundant to a great degree with the scrolling process. The overlay data remains the same for all individual exposures. With each individual exposure, only one line of the picture data of the complete part picture 24 is done away with. The other lines move up in each case by one position, and the line which becomes free at the end obtains new data from the intermediate memory 16. Thereby, the picture data for example for the exposure of the picture strip 25 is taken from a part memory 17 and 18 and is linked to the overlay information, which is likewise deposited in the intermediate memory, whilst the other part memory 18 or 17 in each case is provided with new picture information for the picture strip 26 which is to be subsequently exposed, via the data lead 19. Since the rapid data transmission is effected alone on a circuit board in the exposure unit 8, a permanent data rate of 64 bits×120 MHz is possible.

The data from the picture memory 2 is analysed in the exposure data manager 4 and is distributed further to the individual sub programs. The position data manager thereby obtains a list of positions, speeds or speed curves which must be consecutively moved to. The picture data manager 6 obtains the picture data which must be represented in the light modulator 21 and the overlay data which are to be applied thereby. The scroll means 7 obtains the information for the release of the start of the servomotors 9 and the point-accurate triggering of the exposures. The data flow thereby is released respectively via a FIFO buffer, so that the exposure data manager 4 may preprocess the data and no shortages may occur during the exposure.

The position data manager 5, the picture data manager 6 and the scroll means 7 continuously supply the memory of the motor control 12, the intermediate memory 16 and the trigger card 3 with new data.

The motor control 12 and the intermediate memory 16 although being supplied with data via the data leads 17 and 19, are not informed of the point in time of the use and the further transfer of the respected data. This function is assumed by the trigger card 3. For this reason, a handshake lead 28 is provided between the motor control 12 and the trigger card 3, via which on the one hand the trigger card 3 is informed of the presence of a new travel command and the completion of a travel command. On the other hand, the trigger card 3 via the handshake lead 28 gives the release to the motor control 12 for implementing the respective travel command.

The trigger lead 20 between the trigger card 3 and the intermediate memory 16 transmits trigger impulses which in each case trigger the transmission of the next part picture 24 from the intermediate memory 16 to the light modulator 21. For the exposure of a picture strip 25, 26, the exposure unit 8 is at the beginning of the picture strip 25, and the motor control 12 as a new target position obtains the end position of the picture strip 25. The intermediate memory 16 consecutively obtains the picture data of the picture strips 25, 26 which are to be consecutively exposed. It furthermore obtains information as to in which memory positions the pictures to be transferred individually to the light modulator 21 in a consecutive manner and the overlay data to be applied in each case, are to be stored. The trigger card 3 obtains information as to at which positions the individual picture lines must be exposed.

The trigger card 3 ascertains the presence of all information and thereupon triggers a positioning of the exposure unit 8 per handshake with the motor control 12. A corresponding impulse is outputted on the trigger lead 20 on reaching each pre-programmed position, so that the exposure is synchronised with the movement. Thereby, a trigger impulse is produced, counted for each picture deposited in the intermediate memory.

Whilst such a scrolling procedure takes its course, the respective part memory 17 or 18 which is not used for the transmission of data to the light modulator 21, is loaded parallel with the picture information for the next picture strip 26, so that the exposure of the next picture strip 26 may be effected directly subsequent to the exposure of the preceding picture strip 25.

LIST OF REFERENCE NUMERALS 1. control device
2. picture memory
3. trigger card
4. exposure data manager
5. position data manager
6. picture data manager
7. scroll means
8. exposure unit
9. servomotor
10. light sensitive material
11. control lead
12. motor control
13. position sensor
14. signal lead
15. signal lead
16. intermediate memory
17. part memory
18. part memory
19. data lead
20. trigger lead
21. light modulator
22. light source
23. imaging optics
24. part picture
25. picture strip
26. picture strip
27. data lead
28. hand-shake lead

The invention claimed is:

1. A device for the digital exposure of light-sensitive materials, with an electronic picture memory for storing a master image, with an exposure unit which comprises a light source, an electronically activatable spatial light modulator for representing a two-dimensional part picture of the master image, and imaging optics for projection of the two-dimensional part picture onto the light-sensitive material, with a drive device comprising motors and a motor control, for the movement of the exposure unit parallel to the surface of the light-sensitive material, with a scroll means for scrolling a picture strip of the master image through the light modulator, and with a control device for synchronizing the drive device with the scroll means, wherein a rapid intermediate memory for storing a strip-like region of the master image is provided, from which the picture data for the two-dimensional part picture to be exposed in each case, is transmitted onto the light modulator synchronously with the movement of the exposure unit.

2. A device according to claim 1, wherein the intermediate memory is arranged in the exposure unit.

3. A device according to claim 1, wherein the intermediate memory comprises two part memories for the storage of two picture strips of the master image, and wherein during the transmission of the data from the first part memory to the light modulator for the exposure of the first picture strip, the data for the exposure of the next picture strip of the master image is transmitted from the picture memory to the second part memory.

4. A device according to claim 1, wherein the control device comprises a computer with a control program, wherein the picture memory is also accommodated in the computer.

5. A device according to claim 4, wherein the control program comprises an exposure data manager, a picture data manager and a position data manager, wherein the picture data of the picture memory, is divided into data packages suitable for the stripwise exposure by the exposure data manager, and are transferred to the picture data manager, wherein the exposure data manager produces position data and speed data for the motor control, which are transferred to the position data manager.

6. A device according to claim 5, wherein the control device comprises the scroll means which cooperates with a trigger card designed with regard to hardware, wherein the trigger card is connected to position sensors which deliver data on the actual position of the exposure unit, and wherein the trigger card controls the data flow from the intermediate memory to the light modulator synchronously with the movement of the exposure unit, wherein a handshake between the trigger card and the motor control causes the motor control to call up the position- and speed data from the position data manager and to accordingly activate the servomotors.

7. A device according to claim 6, wherein the scroll means cooperates with the picture data manager in a manner such that the stripwise transmission of the picture data from the picture data manager to the intermediate memory is always effected just at the time when no data for the activation of the light modulator is taken from the respective part memory.

8. A device according to claim 1, wherein the exposure time for a pixel is roughly equal to the travel time which the exposure unit requires for travelling over a pixel width.

9. A device according to claim 1, wherein the division of the master image into picture strips is effected in a manner such that the picture strips partly overlap and that the light quantity per pixel column orientated in the scroll direction, which serves for the exposure, is arranged reducing towards the edges of the picture strips, so that a uniform exposure of the complete printing plate results.

10. A device according to claim 1, wherein the division of the master image into picture strips is effected in a manner such that the picture strips abut on one another in a seamless manner and that the light quantity per pixel column orientated in the scroll direction, which serves for exposure, is set such that the optical impression of the left and of the right edge of the picture strip is identical, so that a uniform exposure of the complete printing plate results.

11. A method for the digital exposure of light-sensitive materials using a device with an electronic picture memory for storing a master image, with an exposure unit which comprises a light source, an electronically activatable spatial light modulator for representing a two-dimensional part picture of the master image, and imaging optics for the projection of the two-dimensional part picture onto the light sensitive material, with a drive device, comprising motors and a motor control, for moving the exposure unit parallel to the surface of the light-sensitive material, with a scroll means for scrolling a picture strip of the master image through the light modulator, and with a control device for synchronizing the drive device with the scroll means, wherein the method encompasses the use of a rapid intermediate memory in which a strip-like region of the master image is stored, from which the picture data for the two-dimensional part picture to be exposed in each case is transmitted onto the light modulator synchronously with the movement of the exposure unit.

12. A method according to claim 11, wherein the intermediate memory comprises two part memories for storing two picture strips of the master image, and wherein during the transmission of the data from a first part memory to the light modulator for the exposure of a first picture strip, the data for the exposure of the next picture strip of the master image is transmitted from the picture memory to the second part memory.

13. A method according to claim 11, wherein the control device comprises a computer with a control program, wherein the control program comprises an exposure data manager, a picture data manager and a position data manager, wherein the picture data of the picture memory is divided by way of the exposure data manager into data packages which are suitable for the stripwise exposure, and are transferred to the picture data manager, and wherein the exposure data manager produces position data and speed data for the motor control which is transferred to the position data manager.

14. A method according to claim 13, wherein the control device comprises the scroll means, wherein the scroll means cooperates with a trigger card which is designed with regard to hardware and which is connected to position sensors, wherein the position sensors provide data on the actual position of the exposure unit, and wherein the trigger card controls the data flow from the intermediate memory to the light modulator synchronously with the movement of the exposure unit, and wherein a handshake between the trigger card and the motor control causes the motor control to call up the position- and speed data from the position data manager, and to accordingly activate the servomotors.

15. A method according to claim 14, wherein the scroll means cooperates with the picture data manager in a manner such that the stripwise transmission of the picture data from the picture data manager to the intermediate memory is always effected just at the time when no data for the activation of the light modulator is taken from the respective part memory.

16. A method according to claim 11, wherein the exposure time for a pixel is roughly equal to the travel time which the exposure unit requires for travelling over a pixel width.

17. A method according to claim 11, wherein the division of the master image into picture strips is effected in a manner such that the picture strips partly overlap, and that the light quantity per pixel column orientated in the scroll direction, which serves for exposure, is arranged decreasing towards the edges of the picture strip, so that a uniform exposure of the complete printing plate results.

18. A method according to claim 11, wherein the division of the master image into picture strips is effected in a manner such that the picture strips abut one another in a seamless manner and that the light quantity per pixel column orientated in the scroll direction, which serves for exposure, is set such that the optical impression of the left and of the right edge of the picture strip is identical, so that a uniform exposure of the complete printing plate results.

* * * * *

UNITED STATES PATENT AND TRADEMARK OFFICE
CERTIFICATE OF CORRECTION

PATENT NO. : 8,547,592 B2
APPLICATION NO. : 10/577930
DATED : October 1, 2013
INVENTOR(S) : Luellau et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1368 days.

Signed and Sealed this
Fifteenth Day of September, 2015

Michelle K. Lee
*Director of the United States Patent and Trademark Office*